United States Patent [19]
Zeldin et al.

[11] Patent Number: 5,693,172
[45] Date of Patent: Dec. 2, 1997

[54] METHODS AND COMPOSITIONS FOR INTERFACIALLY BONDING MINERAL SURFACES AND THE LIKE

[76] Inventors: Martel Zeldin, 8738 Lancaster Rd., Indianapolis, Ind. 46260; Wilmer K. Fife, 7102 Dean Rd., Indianapolis, Ind. 46240

[21] Appl. No.: 482,439

[22] Filed: Jun. 7, 1995

Related U.S. Application Data

[62] Division of Ser. No. 957,653, Oct. 7, 1992, Pat. No. 5,427,860.

[51] Int. Cl.$^6$ .................. B32B 9/00; C09J 5/02
[52] U.S. Cl. ............... 156/307.3; 428/420; 428/426
[58] Field of Search ........................ 428/429, 420; 156/307.3, 314, 326

[56] References Cited

U.S. PATENT DOCUMENTS

| | | | |
|---|---|---|---|
| 3,585,103 | 6/1971 | Thomson | 156/314 |
| 3,837,897 | 9/1974 | Marzocchi | 428/378 |
| 3,867,328 | 2/1975 | Fahey | 524/510 |
| 4,997,944 | 3/1991 | Zeldin et al. | 546/14 |
| 5,284,707 | 2/1994 | Ogawa et al. | 428/429 |
| 5,427,860 | 6/1995 | Zeldin et al. | 428/429 |

FOREIGN PATENT DOCUMENTS

| | | | |
|---|---|---|---|
| 0036648 | 3/1981 | European Pat. Off. | 428/429 |
| 2003899 | 3/1979 | United Kingdom | 156/326 |

*Primary Examiner*—Peter F. Kulkosky
*Attorney, Agent, or Firm*—Woodard, Emhardt, Naughton, Moriarty & McNett

[57] ABSTRACT

Described are preferred methods for promoting interfacial bonding between surfaces containing oxide, hydrous oxide or hydroxyl groups. The methods involve attaching silane coupling agents to the opposed surfaces and, in turn, bonding the opposed silane coupling agents to each other to thereby promote interfacial bonding between the surfaces. Also described are preferred compositions for promoting such interfacial bonding.

13 Claims, No Drawings

METHODS AND COMPOSITIONS FOR INTERFACIALLY BONDING MINERAL SURFACES AND THE LIKE

This application is a division of application Ser. No. 07/957,653, filed Oct. 7, 1992, now U.S. Pat. No. 5,427,860.

BACKGROUND OF THE INVENTION

The present invention generally relates to methods and materials for bonding one surface to another. More particularly, this invention relates to novel methods and compositions for promoting interfacial bonding between surfaces containing oxide, hydrous oxide or hydroxyl groups.

As background, it is generally known to use organosilane coupling agents to promote bonding between mineral surfaces and organic substrates. For instance, products like conveyer belts, tires, and hose have long been made from natural or synthetic rubber that is reinforced with glass fibers. It is known to promote bonding of the glass fibers to the rubber in these products via organosilane coupling agents. U.S. Pat. No. 3,589,931 to Marzocchi et al., for example, describes glass fiber reinforced elastomeric products in which glass-to-elastomer bonding is promoted with an organo-silicon compound. As indicated in this Marzocchi et al. patent, the organo-silicon compound is capable of strong attachment to the glass fiber through silicon oxide linkages and contains ethylenic or acetylenic unsaturation to permit sulphur cross-linakages between the unsaturation of the organo-silicon compound and the unsaturated groups of the uncured elastomer.

Similarly, U.S. Pat. Nos. 3,718,449, 3,867,328 and 3,852,051 to Fahey describe systems in which coupling agents can be used to promote improved adhesion between glass fibers and elastomeric materials such as natural and synthetic rubber. These Marzocchi et al. and Fahey patents stem from an extensive field of research in which systems for promoting bonding between glass and elastomeric materials have been explored. However, to date, there has not been as much study in this area of improving interfacial adhesion of mineral surfaces such as glass. Accordingly, there exists a need for effective methods and compositions for promoting interfacial bonding of mineral and like surfaces. It is this need to which the present invention is addressed.

SUMMARY OF THE INVENTION

Addressing this need, the invention provides in one preferred embodiment a method for interfacially bonding surfaces containing oxide, hydrous oxide or hydroxyl groups. The inventive method includes the step of chemically modifying the surfaces with (i) a pyridylsilane coupling agent and at least a difunctional alkylating agent, or (ii) an alkylating silane coupling agent and a pyridine-containing polymer. This reaction is conducted so as to cause the surfaces to be interfacially bonded.

Another preferred embodiment of the present invention provides a composition for interfacially bonding surfaces containing oxide, hydrous oxide or hydroxyl groups. The composition includes (i) a pyridylsilane coupling agent and a difunctional alkylating agent, or (ii) an alkylating silane coupling agent and a pyridine-containing polymer or precursor thereto. These materials are included in effective amounts to interfacially bond surfaces containing oxide, hydrous oxide or hydroxyl groups.

By these preferred embodiments, methods and compositions are provided which can firmly and stably bond or adhere surfaces to each other. Further, the bonding can be achieved in a number of fashions which provide unique processing variability to end users of the inventive methods and compositions. For example, the surfaces can be initially silylated with the pyridylsilane coupling agent or the alkylating silane coupling agent. Some time thereafter, the pyridine polymer or precursor thereto, or the difunctional alkylating agent, whichever is appropriate in light of the coupling agent used, can be applied and reacted between the pre-treated surfaces in order to achieve the bonding. Alternatively, the pyridine-containing and the alkylating materials can be simultaneously applied and reacted between the surfaces to achieve bonding. As further advantages, methods and compositions of the invention provide interfacial adhesion between both similar and diverse surfaces. Additional objects, features and advantages of the invention will be apparent from the following description.

DESCRIPTION OF THE PREFERRED EMBODIMENT

For the purposes of promoting an understanding of the principles of the invention, reference will now be made to certain embodiments. It will nevertheless be understood that no limitation of the scope of the invention is thereby intended, such alterations, further modifications and applications of the principles of the invention as described herein being contemplated as would normally occur to one skilled in the art to which the invention pertains.

As indicated, the methods and compositions of the present invention provide interfacial bonding between surfaces containing oxide, hydrous oxide or hydroxyl groups. Representative surfaces to which the invention can be successfully applied include mineral surfaces such as glass, ceramic and the like, as well as metal-oxide containing surfaces, for example. In addition to promoting bonding between similar surfaces, for example glass to glass, ceramic to ceramic and metal oxide to metal oxide, the invention also provides bonding between dissimilar surfaces, for example glass to ceramic, glass to metal-oxide, ceramic to metal-oxide, etc. In accordance with the applicants' work thus far, the surfaces simply need to contain one or more of oxide, hydrous oxide or hydroxyl groups. In a broadened sense, the invention can be applied to any surface with which a silane coupling agent can stably form a silicon oxide (i.e. —Si—O—) bond.

In this regard, silane coupling agents generally are well known and recognized. As is known, a silane coupling agent is a compound having the general formula $F_{(4-n)}SiR_n$, in which n=an integer from one (1) to three (3), F is a readily hydrolyzable group, and R is an organic group which is not susceptible to hydrolysis. Representative readily hydrolyzable groups (F) include halogens (e.g. flourine, chlorine or bromine) and oxy groups of the formula —O—R' wherein R' is an organic group typically having about 1 to 8 carbon atoms. For example, R' can be a branched or unbranched, saturated or unsaturated aliphatic group such as an alkyl group, e.g. methyl, ethyl, propyl, butyl, pentyl, hexyl, heptyl, octyl, etc., or corresponding alkenyl group, or another organic group which provides a readily hydrolyzable oxy group. Readily hydrolyzable groups (F) also include amido groups of the formula —NR"$_2$ wherein R" can be H or an organic group as exemplified for R" above, as well as other functional groups which are readily hydrolyzable so as to allow the coupling agent to form a silicon oxide bond with the surface to be adhered.

In accordance with the present invention, the silane coupling agent will be either a pyridylsilane coupling agent or an alkylating silane coupling agent. Accordingly, in the case of a pyridylsilane coupling agent, at least one organic group R will contain a pyridine group with its ring nitrogen susceptible to alkylation and formation of a quaternary salt bond. In the case of an alkylating silane coupling agent, at least one organic group R will have an alkylating function (A) effective to alkylate pyridine nitrogen. Preferred alkylating silane coupling agents have the general formula $(F)_3Si-R_n-A$ wherein n=0 or 1, R is as defined above, and A is an alkylating function. The alkylating function (A) can be any of those known to be capable of alkylating pyridine nitrogens. Representative groups (A) thus include halogens such as bromine or chlorine; activated ester groups such as esters of sulfonic acids, e.g. tosylates (i.e. esters of para-toluene sulfonic acid, especially lower alkyl (i.e. $C_1$ to about $C_5$ alkyls) esters), reactive triflates (i.e. esters of trifluoromethyl sulfonic acid, again especially lower alkyl esters), and the like. Preferably, A is alkylene group (e.g. $(CH_2)_m$ wherein m=1 to about 10). a halogen and R is an aliphatic group, especially one having from 1 to about 10 carbon atoms. For example, R is desirably an Representative preferred alkylating silane coupling agents include 2-bromoethyltriethoxy silane, 2-chloroethyltriethoxy silane, 3-bromopropyltriethoxy silane, 3-bromopropyltrimethoxy silane, 3-bromopropyltrichloro silane, 2-bromoethyltrichloro silane, bromomethyltrichloro silane, bromomethyltriethoxy silane, bromomethyltriethoxy silane, bromovinyltrichloro silane, bromovinyltriethoxy silane, bromovinyltrimethoxy silane, bromoallyltriethoxy silane, φ-bromocylcohexylethyltrimethoxy silane, bromobenzyltriethoxy silane; as well as these same agents except wherein the bromo- or chloro- alkylating function (A) is instead an activated ester group as illustrated above; as well as these agents wherein the alkoxy or halo groups satisfying (F) are instead other groups susceptible to hydrolysis such as amido groups —$NR''_2$ as exemplified above. Representative preferred pyridylsilane coupling agents include those having the general formula $(F)_3Si-(R)_n-Py$ wherein F is as defined above, n=0 or 1, Py is a pyridyl group (i.e. 2-, 3- or 4-pyridyl), and R is as defined above. Among these, R is advantageously aliphatic, especially alkylene of up to about 10 carbon atoms. Thus particularly preferred pyridylsilane coupling agents will have the general formula $(F)_3Si-(CH_2)_m-Py$ where m=an integer from 0 to about 10, especially from 0 to about 5. Among these, Py is desirably a 4-pyridyl group. Particularly advantageous pyridylsilane coupling agents thus include 4-triethoxysilylpyridine, 4-(3-triethoxysilylpropyl)pyridine, 4-triethoxysilylpyridine, 4-(3-triethoxysilylpropyl)pyridine, 4-triethoxysilylpyridine, 4-.triethoxysilylpyridine and corresponding agents wherein the alkoxy group satisfying (F) is instead a halo- or amido group as identified above. For additional information as to silanes containing pyridine groups and to methods for their preparation, reference can be made to U.S. Pat. Nos. 4,855, 433 and 4,997,994 to Zeldin et al., each hereby incorporated by reference.

The above-identified pyridylsilane or alkylating silane coupling agent is used in conjunction with another agent (hereinafter referred to as a "bonding agent" for purposes of discussion) to achieve bonding according to the invention. When a pyridylsilane coupling agent is used, the bonding agent will be a difunctional alkylating agent (i.e. having at least two alkylating functions such as those functions (A) identified above). Preferred difunctional alkylating agents thus include polyhalogenated aliphatic compounds having about 1 to 10 carbon atoms, e.g. 1,2-dibromoethane, 1,3-dibromopropane, 1,3-dichloropropane, 1,2-dibromopropane, 1,4-dibromobutane, 1,3-dibromobutane, 1,4-dichlorobutane, etc.; and similarly polyhalogenated alkenes, arylalkyls, etc., as well as their counterparts wherein the halo- groups are instead activated ester or other alkylating functions as exemplified above. When the silane coupling agent used is an alkylating silane coupling agent, the corresponding bonding agent will provide at least two (2) attached pyridine groups having ring nitrogens available for alkylation. Preferred pyridine-containing bonding agents include polymers having attached pyridine groups, e.g. polyvinylpyridine polymers, co-polymers or ter-polymers, etc, as well as monomer precursors, e.g. vinyl pyridine monomers 2-, 3- or 4-vinylpyridine monomers) thereto which can be reacted in situ to provide the polymer bonding agent.

In practice, the interfacial bonding of the invention is achieved by reacting the above-described silane coupling agent (pyridyl- or alkylating) and its corresponding bonding agent between the subject surfaces so as to cause the surfaces to be interfacially bonded. This process step can be suitably performed in several ways. For example, the surfaces to be bonded can be pre-treated with the silane coupling agent. Afterwards, the bonding agent can be sandwiched between the pre-treated surfaces and the agents reacted to interfacially bond the surfaces. Alternatively, a mixture including the bonding agent and silane coupling agent can be sandwiched between the subject surfaces, and thereafter reacted to achieve bonding. Each of these modes can provide an interfacial bond of the surfaces which is both qualitatively strong and stable. For example, this strong, stable bonding is demonstrated by boiling the bonded substrate in methanol and/or water solvents and observing little or no change in the bond, as is illustrated in the specific Examples given below.

In the preferred embodiments of the invention, the reaction providing beneficial bonding occurs upon heating. Further, as is well known and will be readily understood and practiced by those in the area, the effective silylation of the subject surfaces by the silane coupling agents can be enhanced by the presence of an amine catalyst. This amine catalyst can be a material other than the silane coupling agent or bonding agent, or, effective amine catalytic activity can be achieved where the silane coupling agent and/or bonding agent themselves contain amine groups. Similarly, skilled artisans will recognize that the subject surfaces can be pre-treated with appropriate agents, for example caustic, to improve the surface characteristics for silylation.

While not intending the invention to be limited by any theory, it is believed that the advantageous bonding of the invention is promoted by the alkylation of pyridine nitrogens and concommitant formation of pyridine quaternary salt groups. For instance, such bonding in certain preferred schemes can be illustrated by Scheme I (pyridylsilane coupling agent=4-triethoxysilylpyridine, difunctional alkylating agent=1,3-dibromopropane), Scheme II (alkylating silane coupling agent =3-bromopropyl triethoxy silane, bonding agent=pyridine-containing polymer) and Scheme III (alkylating silane coupling agent=3-bromopropyl triethoxy silane, bonding agent=polymerizable pyridine monomer). In these Schemes the vertical lines represent the surfaces containing, for example, hydroxy groups to be bonded, and P generally represents a polymer backbone:

SCHEME I
(4-triethoxysilyl pyridine/1,3-dibromopropane)

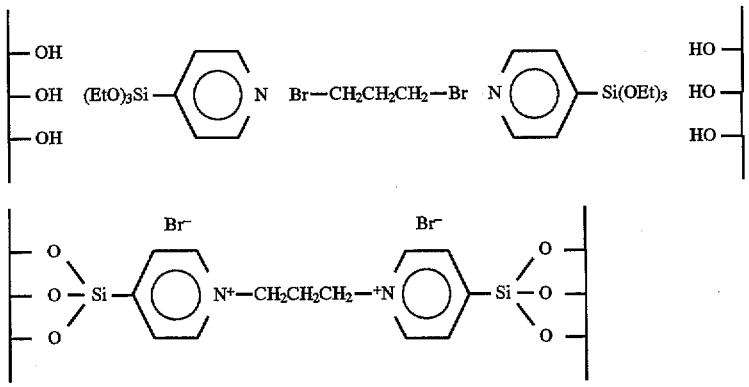

SCHEME II
(3-bromopropyl triethoxy silane/pyridine-containing polymer)

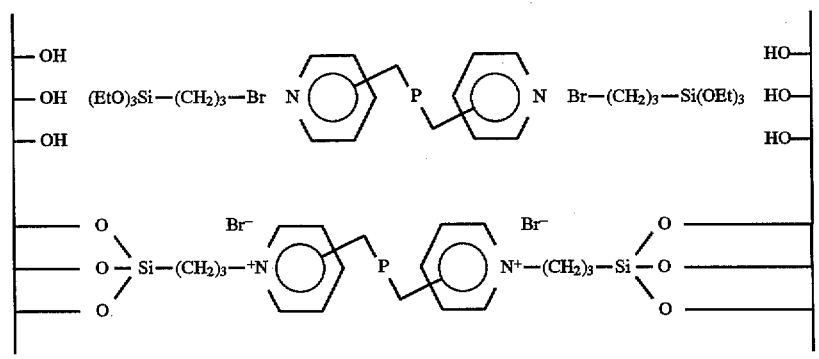

SCHEME III
(3-bromopropyl triethyoxy silane/polymerizable pyridine monomer)

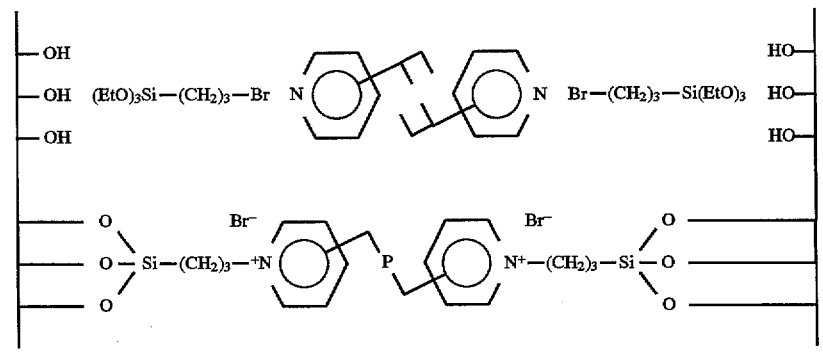

As can be seen in Schemes I–III, the silane coupling agent couples to the subject surface by the formation of silicon oxide (—Si—O—) bonds. Pyridine nitrogens in the bonding system are alkylated to form quaternary salt groups and provide overall bonding between the subject surfaces. It will be understood that these Schemes are set forth for illustrative purposes, and that no limitation of the invention or its mode of achievement is thereby intended.

In order to promote a further understanding of the principles and advantages of the invention, the following specific Examples are provided. It will be likewise understood that these specific Examples are illustrative, and not restrictive of the invention.

EXAMPLE 1

A number of etched glass slides were immersed in 40% aqueous NaOH solution at 100° C. to increase hydroxylation of the surface. The slides were then washed thoroughly with water, To a solution of poly(4-vinylpyridine) (Reilline 450) in dimethylformamide (DMF) (40% by volume) was added sufficient triethoxy-3-bromopropyl silane to achieve a volumetric ratio for P4VP:silane of 12:1. Several drops of triethylamine were then added to the resulting solution. Several drops of the solution prepared as above were placed on each slide. Treated slide surfaces were then pressed and held together with a clip. In several experiments, clipped slide pairs were then heated for 1 to 48 hours at 100° C., after which they were cooled to room temperature and tested qualitatively for adhesion. It was discovered that the slides could not be pulled apart by hand. Further, to test the stability of adhesion upon exposure to solvents, the bonded slides were subjected to boiling methanol for 24 hours and boiling water for up to 16 hours or more. No apparent change in adhesion occurred even after this rigorous treatment.

EXAMPLES 2–9

The procedure of Example 1 is repeated, except replacing the 3-bromoethyl triethoxy silane and/or poly-4-vinylpyridine with the following functionalized silanes and pyridine polymers indicated in Table 1.

TABLE 1

| Ex. | Silane Coupling Agent | Pyridine Polymer |
|---|---|---|
| 2 | 3-Bromopropyl diethoxy silane | Poly-4-vinylpyridine |
| 3 | Di-2-bromoethyl diethoxy silane | Poly-4-vinylpyridine |
| 4 | 3-Bromopropyl trimethoxy silane | Poly-2-vinylpyridine |
| 5 | 3-Bromopropyl dimethoxy silane | Poly-4-vinylpyridine |
| 6 | 2-Bromoethyl triethoxy silane | Poly-2-vinylpyridine |
| 7 | α-Bromobenzyl triethoxy silane | Poly-4-vinylpyridine |
| 8 | 3-Bromopropyl tripropoxy silane | Poly-4-vinylpyridine |
| 9 | 3-Bromopropyl trichloro silane | Poly-4-vinylpyridine |
| 10 | 3-Acetoxypropyl triethyoxy silane | Poly-4-vinylpyridine |
| 11 | Triamino-3-Bromopropyl silane | Poly-4-vinylpyridine |

EXAMPLE 12

A number of slides were initially treated as described in Example 1. To a solution of 4-vinylpyridine monomer in methylene chloride was added sufficient 3-bromopropyl triethoxy silane to obtain a monomer:silane volumetric ratio of at least about 1:2. Several drops of triethylamine were added to the resulting solution. Slide pairs were clipped together as done in Example 1. Subsequent heating to 100° C. bonded the slides together, with results similar to those in Example 1.

EXAMPLES 13–22

The procedure of Example 12 is repeated, except replacing the 3-bromoethyl trimethyl silane and/or 4-vinylpyridine monomer with the functionalized silanes and monomers as indicated in Table 2.

TABLE 2

| Ex. | Silane Coupling Agent | Pyridine Monomer |
|---|---|---|
| 13 | 3-Bromopropyl diethoxy silane | 4-vinylpyridine |
| 14 | Di-2-bromoethyl diethoxy silane | 4-vinylpyridine |
| 15 | 3-Bromopropyl trimethoxy silane | 2-vinylpyridine |
| 16 | 3-Bromopropyl dimethoxy silane | 4-vinylpyridine |
| 17 | 2-Bromoethyl triethoxy silane | 2-vinylpyridine |
| 18 | 4-Bromophenyl triethoxy silane | 4-vinylpyridine |

TABLE 2-continued

| Ex. | Silane Coupling Agent | Pyridine Monomer |
|---|---|---|
| 19 | 3-Bromopropyl tripropoxy silane | 4-vinylpyridine |
| 20 | 3-Bromopropyl trichloro silane | 4-vinylpyridine |
| 21 | 3-Acetoxypropyl triethoxy silane | 4-vinylpyridine |
| 22 | Triamido-3-bromopropyl silane | 4-vinylpyridine |

EXAMPLE 23

A number of etched glass slides are immersible in 40% aqueous NaOH solutions at 100° C., and then these Slides are washed throughly with water. Surfaces of the slides are then wiped with a solution of 3-bromopropyl triethoxy silane in DMF (10–40% by volume) to which several drops of triethylamine have been added. After the above procedure by which the silane was first coupled to the slide surface, poly(4-vinylpyridine) in DMF (10–40% by volume) was sandwiched between treated surfaces of two slides, the slides clipped together and heated to 100° C. The bonded slides were then tested for qualitative adhesion and stability of adhesion as described in Example 1. The adhesion and its stability were again found to be excellent, as the slides could not be pulled apart and demonstrated no apparent change in adhesion after boiling in methanol or water. It thus is demonstrated that oxide surfaces can be pre-silylated with silylating coupling agent, and subsequently bonded by heating a polymer with pyridine groups between the surfaces.

EXAMPLES 24–33

The procedure of Example 23 is repeated, except replacing the 3-bromoethyl triethoxy silane and/or poly(4-vinylpyridine) with the functionalized silanes and/or pyridine polymers indicated in Table 3. In each case, highly advantageous adhesion is achieved, with results of qualitative adhesion and adhesion stability analysis being similar to those obtained in Example 1.

TABLE 3

| Ex. | Silane Coupling Agent | Pyridine Polymer |
|---|---|---|
| 24 | 3-Bromopropyl diethoxy silane | Poly(4-vinylpyridine) |
| 25 | Di-2-Bromoethyl diethoxy silane | Poly(4-vinylpyridine) |
| 26 | 3-Bromopropyl trimethoxy silane | Poly(2-vinylpyridine) |
| 27 | 3-Bromopropyl dimethoxy silane | Poly(4-vinylpyridine) |
| 28 | 2-Bromoethyl triethoxy silane | Poly(2-vinylpyridine) |
| 29 | α-Bromobenzyl triethoxy silane | Poly(4-vinylpyridine) |
| 30 | 3-Bromopropyl tripropoxy silane | Poly(4-vinylpyridine) |
| 31 | 3-Bromopropyl trichloro silane | Poly(4-vinylpyridine) |
| 32 | 3-Acetoxypropyl triethoxy silane | Poly(4-vinylpyridine) |
| 33 | Triamino-3-Bromopropyl silane | Poly(4-vinylpyridine) |

EXAMPLES 34–35

As in Example 29, initially treated slides were wiped with a solution of 3-bromoethyl triethoxy silane in DMF (20% by volume) also having therein several drops of triethylamine. In separate experiments, 4-vinylpyridine monomer or 2-vinylpyridine monomer was sandwiched between treated surfaces of the slides, and the slide pairs clipped together and heated to 200° C. By this procedure, the slides are firmly bonded with results proving similar to those obtained in the Examples above.

EXAMPLE 36

Pyridylsilane Pretreatment Followed by Bonding With Dihalogenated Hydrocarbon

A number of etched glass slides were treated with an aqueous NaOH solution as initially described in Example 1 above. The slides were washed throughly with water. Surfaces of these slides were then wiped with the solution of 4-triethoxysilylpyridine in DMF (20% by volume) to which several drops of triethylamine had been added. Subsequently, 1,3-dibromopropane was sandwiched between treated surfaces of a pair of slides and clipped together, and heated to 100° C. Successful and stable adhesion was again achieved.

EXAMPLES 37–43

Example 30 is repeated except using the pyridyl silanes and polyfunctional quaternizing agents indicated in Table 4 below. Similar successful results are obtained, with the adhesion proving qualitatively good and stable upon testing as described in Example 1.

TABLE 4

| Ex. | Silane Coupling Agent | Quarternizing Agent |
|---|---|---|
| 37 | 4-triethoxysilylpyridine | 1,4-dibromobutane |
| 38 | 4-(3-triethoxysilylpropyl)pyridine | 1,3-dibromopropane |
| 39 | 4-triethoxysilylpyridine | 1,4-dibromo-2-butene |
| 40 | 4-(3-triethoxysilylpropyl)pyridine | 1,3-dibromobutane |
| 41 | 4-triethoxysilylpyridine | 1,10-dibromodecane |
| 42 | 4-triethoxysilylpyridine | α,α'-dibromo-para-xylene |
| 43 | 4-triethoxysilylpyridine | 1,4-diacetoxybutane |

While the invention has been illustrated and described in detail in the foregoing description, the same is to be considered as illustrative and not restrictive in character, it being understood that only the preferred embodiment has been described and that all changes and modifications that come within the spirit of the invention are desired to be protected.

What is claimed is:

1. A method of interfacially bonding oxide-, hydroxide- or hydrous-oxide-containing surfaces, comprising:

reacting between said surfaces a pyridylsilane coupling agent of the formula $$F_{(4-n)}SiR_n$$

wherein n=and integer from 1 to 3;

R is an organic group;

F is a readily hydrolyzable group selected from a halogen, a group of the formula —O—R' wherein R' is an organic group having from 1 to about 8 carbon atoms, and a group of the formula —NR"$_2$, wherein R" is —H or an organic group having from 1 to about 8 carbon atoms;

with the proviso that at least one organic group R contains a pyridine group having a ring nitrogen susceptible to alkylation;

and a difunctional alkylating agent which is an aliphatic or arylalkyl compound having two or more halogen or activated ester groups effective for alkylating said ring nitrogen;

so as to cause said surfaces to be interfacially bonded.

2. The method of claim 1 which includes the steps of:

providing between said surfaces said pyridylsilane coupling agent and said difunctional alkylating agent; and heating the provided materials so as to cause said surfaces to be interfacially bonded.

3. The method of claim 2 wherein the difunctional alkylating agent is an aliphatic compound having two or more halogen groups.

4. The method of claim 1 which includes the steps of:

silylating the surfaces with said pyridylsilane coupling agent;

providing between said silylated surfaces, said difunctional alkylating agent; and reacting the coupling agent and alkylating agent so as to cause said surfaces to be bonded.

5. The method of claim 4 wherein said reacting is promoted by heating the provided materials.

6. The method of claim 5 wherein the difunctional alkylating agent as two or more halogen groups.

7. The method of claim 6 wherein n=1 and R is a group of the formula —(CH$_2$)$_m$—Py wherein m=0 to about 10 and Py is a pyridyl group.

8. The method of claim 7 wherein the difunctional alkylating agent is a dihalo-aliphatic compound.

9. The method of claim 8 wherein n=1 and R is a group of the formula —(CH$_2$)$_m$—Py wherein m=0 to about 10 and Py is a pyridyl group.

10. A composition for interfacially bonding surfaces containing oxide, hydrous oxide or hydroxide groups, comprising:

a pyridylsilane coupling agent of the formula $$F_{(4-n)}SiR_n$$

wherein n=and integer from 1 to 3;

R is an organic group;

F is a readily hydrolyzable group selected from a halogen, a group of the formula —O—R' wherein R' is an organic group having from 1 to about 8 carbon atoms, and a group of the formula —NR"$_2$, wherein R" is —H or an organic group having from 1 to about 8 carbon atoms;

with the proviso that at least one organic group R contains a pyridine group having a ring nitrogen susceptible to alkylation;

and a difunctional alkylating agent which is an aliphatic or arylalkyl compound having two or more halogen or activated ester groups effective for alkylating said ring nitrogen;

in effective amounts to interfacially bond said surfaces.

11. The composition of claim 10 wherein n=1 and R is a group of the formula —(CH$_2$)$_m$—Py wherein m=0 to about 10 and Py is a pyridyl group.

12. The composition of claim 11 wherein the difunctional alkylating agent is a dihalo-aliphatic compound.

13. The composition of claim 12 wherein n=1 and R is a group of the formula —(CH$_2$)$_m$—Py wherein m=0 to about 10 and Py is a pyridyl group.

* * * * *

UNITED STATES PATENT AND TRADEMARK OFFICE
CERTIFICATE OF CORRECTION

PATENT NO. : 5,693,172
DATED : December 2, 1997
INVENTOR(S) : Martel Zeldin et al.

It is certified that error appears in the above-indentified patent and that said Letters Patent is hereby corrected as shown below:

In col. 2, line 62, please delete " R" " and insert in lieu thereof -- R' --.

In col. 3, lines 18-19, please delete "alkylene group (e.g. $(CH_2)_m$ wherein m=1 to about 10)" and insert that same text in col. 3, line 21 after "an".

In col. 3, line 28, please delete "bromomethyltriethoxy" and insert in lieu thereof --bromomethyltrimethoxy--.

In col. 4, line 15, please insert -- (i.e. --before the text beginning " 2- ".

Signed and Sealed this

Sixteenth Day of November, 1999

Attest:

Q. TODD DICKINSON

*Attesting Officer*   *Acting Commissioner of Patents and Trademarks*